United States Patent
Wang et al.

(10) Patent No.: US 8,948,780 B2
(45) Date of Patent: Feb. 3, 2015

(54) METHOD FOR COLLECTING PER CALL MEASUREMENT DATA AND MOBILITY MANAGEMENT DEVICE AND BASE STATION THEREOF

(75) Inventors: Yunhua Wang, Shanghai (CN); Lingfeng Lin, Shanghai (CN); Pingbao Lv, Shanghai (CN); Ming Chen, Shanghai (CN); Wei Guo, Shanghai (CN); Yuchu Ma, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 281 days.

(21) Appl. No.: 13/517,338

(22) PCT Filed: Dec. 23, 2009

(86) PCT No.: PCT/CN2009/001536
§ 371 (c)(1),
(2), (4) Date: Jun. 20, 2012

(87) PCT Pub. No.: WO2011/075868
PCT Pub. Date: Jun. 30, 2011

(65) Prior Publication Data
US 2012/0258685 A1    Oct. 11, 2012

(51) Int. Cl.
*H04W 74/00*    (2009.01)
*H04L 12/26*    (2006.01)
(Continued)

(52) U.S. Cl.
CPC ............... *H04L 43/08* (2013.01); *H04W 24/08* (2013.01); *H04W 88/08* (2013.01)
USPC ......... 455/456.1; 455/450; 455/436; 370/331

(58) Field of Classification Search
USPC ............ 455/456.1–456.6, 436–442; 370/329, 370/331
See application file for complete search history.

(56) References Cited

U.S. PATENT DOCUMENTS

| 2007/0201640 A1 | 8/2007 | Wu et al. |
| 2008/0101570 A1 | 5/2008 | Cai |

(Continued)

FOREIGN PATENT DOCUMENTS

| CN | 1992752 A | 7/2007 |
| CN | 101102596 A | 1/2008 |

(Continued)

OTHER PUBLICATIONS

International Search Report for PCT/CN2009/001536 dated Sep. 30, 2010.

(Continued)

*Primary Examiner* — Wayne Cai
(74) *Attorney, Agent, or Firm* — Fay Sharpe LLP

(57) ABSTRACT

A method for collecting per call measurement data PCMD is proposed in the present invention. The method comprises: when an instruction to activate a PCMD-related function is received, sending by a base station a message including an indication of whether the base station is capable of collecting the PCMD to a mobility management entity MME device; when an instruction to start PCMD collection is received, sending by the MME device a message including an indication of starting collecting the PCMD to at least one base station capable of collecting the PCMD; based on the received indication of starting collecting the PCMD, collecting by the base station the PCMD for at least one user equipment UE connection. A mobility management entity device and a base station for collecting the per call measurement data PCMD are also proposed in the present invention.

9 Claims, 3 Drawing Sheets

(51) Int. Cl.
*H04W 24/08* (2009.01)
*H04W 88/08* (2009.01)

(56) References Cited

U.S. PATENT DOCUMENTS

2011/0044283 A1* 2/2011 Rubin et al. .................. 370/331
2013/0053055 A1* 2/2013 Kumar ........................ 455/456.1

FOREIGN PATENT DOCUMENTS

JP 08-037526 2/1996
JP 2002-374557 12/2002
JP 2009-284237 12/2009

OTHER PUBLICATIONS

"Accessibility to performance and measurement data in eNodeB," $3^{rd}$ Generation Partnership Project (3GPP), 3GPP TSG RAN WG3 #55bis, R3-070563, pp. 1-3, St. Julian's, Malta, Mar. 29-30, 2007.
"Integration of device management information with Itf-N," $3^{rd}$ Generation Partnership Project (3GPP), 3GPP TR 32,827, V0.3.0, pp. 1-20, Nov. 2009.

* cited by examiner

METHOD FOR COLLECTING PER CALL MEASUREMENT DATA AND MOBILITY MANAGEMENT DEVICE AND BASE STATION THEREOF

FIELD OF THE INVENTION

The present invention relates to a mechanism for collecting system performance information in a communication system, and more particularly relates to a method for collecting per call measurement data in a wireless communication system, and a mobility management entity device and a base station for implementing the method.

BACKGROUND OF THE INVENTION

Currently, the system performance information collection in a communication system mainly relies on a cumulative measurement counter. However, the cumulative measurement counter cannot be used to analyze individual communication connections.

Per call measurement data (PCMD) is an information record related to each call, and it records a series of key information for network optimization, such as a call type, a call drop type, power or quality of a received signal, a Signal to Interference plus Noise Ratio, block error rate, etc.

The PCMD can provide valuable data for analyzing the performance of a communication network and troubleshooting the communication network.

Compared with the existing measurement counter collection, the PCMD collection provides a more flexible and scalable manner for reporting the system performance information and can be used to analyze individual communication connections.

SUMMARY OF THE INVENTION

In order to solve the aforesaid problem, the present invention proposes a method for collecting per call measurement data, and a mobility management entity device and a base station for implementing the method.

According to one aspect of the present invention, there is provided a method for collecting per call measurement data PCMD, comprising: when an instruction to activate a PCMD-related function is received, sending by a base station a message including an indication of whether the base station is capable of collecting the PCMD to a mobility management entity MME device; when an instruction to start PCMD collection is received, sending by the MME device a message including an indication of starting collecting the PCMD to at least one base station capable of collecting the PCMD; based on the received indication of starting collecting the PCMD, collecting by the base station the PCMD for at least one user equipment UE connection.

The method further comprises: sending by the base station a message including the collected PCMD to the MME device.

The method further comprises: when an instruction to stop the PCMD collection is received, sending by the MME device a message including an indication of stopping collecting the PCMD to the at least one base station capable of collecting the PCMD.

The method further comprises: based on the received indication of stopping collecting the PCMD, stopping the PCMD collection for the at least one UE connection and discarding any unsent PCMD data for the at least one UE connection by the base station.

The method further comprises: based on the received message including the indication of whether the base station is capable of collecting the PCMD, adding by the MME device the base station capable of collecting the PCMD to a PCMD contact list of the MME device.

The method further comprises: when an instruction to deactivate the PCMD-related function is received, sending by the base station a message indicating that the base station is incapable of collecting the PCMD to at least one MME device having a signaling association with the base station.

According to another aspect of the present invention, there is provided a mobility management entity MME device for collecting per call measurement data PCMD, comprising: a receiving device for receiving an instruction to start/stop PCMD collection; and a controlling device for controlling, when the instruction to start the PCMD collection is received, a sending device to send a message including an indication of starting collecting the PCMD to at least one base station capable of collecting the PCMD, and controlling, when the instruction of stopping the PCMD collection is received, the sending device to send a message including an indication of stopping collecting the PCMD to the at least one base station capable of collecting the PCMD; and the sending device for sending the message including the indication of starting and/or stopping collecting the PCMD to the at least one base station capable of collecting the PCMD.

Wherein, the receiving device of the mobility management entity MME device is further configured for receiving a message including an indication of whether the base station is capable of collecting the PCMD, and receiving a message sent by the base station, which includes the collected PCMD.

According to another aspect of the present invention, there is provided a base station for collecting per call measurement data PCMD, comprising: a receiving device for receiving a message sent from a mobility management entity MME device, which includes an indication of starting and/or stopping collecting the PCMD; a collecting device for collecting the PCMD for at least one user equipment UE connection, when the message including the indication of starting collecting the PCMD is received; and a sending device for sending a message including the collected PCMD to the MME device.

Wherein the sending device of the base station is further configured for sending a message including an indication of whether the base station is capable of collecting the PCMD to the MME device.

The solution according to the present invention provides capability to enable/disable the PCMD collection function at the base station and the mobility management entity, and can collect measurement data for every UE connection. The PCMD mechanism according to the present invention provides a more flexible and scalable method for collecting system performance information, and can be used to analyze individual communication connections.

BRIEF DESCRIPTION OF THE DRAWINGS

The aforesaid and other aspects, features and advantages of the present invention will become more apparent by making references to the following detailed description of non-limiting embodiments of the present invention in conjunction with the accompanying drawings, in which.

DETAILED DESCRIPTION OF EMBODIMENTS

Figure 1:
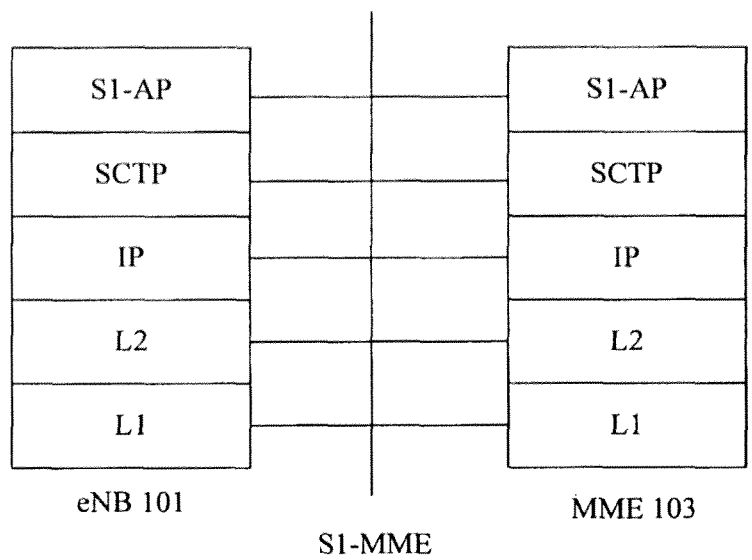
FIG. 1 illustrates a control plane structure of eNB-MME in a LTE system according to one embodiment of the present invention.

Exemplary embodiments of the present invention will be described below by making references to the accompanying drawings. In the exemplary embodiments, taking the LTE system as an example. In the LTE system, a typical evolved Node B (eNB)—mobility management entity (MME) control plane structure is illustrated in FIG. 1. An SCTP protocol is used to ensure accurate transmission of signaling messages between an eNB 101 and a MME 103, and IETF RFC related documents may be referred to for details.

However, it should be understood by those skilled in the art that the scope of the present invention is not limited to the exemplary embodiments. The exemplary embodiments are only used for description purposes, and they shall be regarded as examples of the present invention rather than any limitation on the present invention. Any solution of enabling/disabling PCMD collection that conforms to the scenarios of the embodiments in the present invention falls into the protection scope of the present invention.

In the LTE system according to embodiments of the present invention, the MME 103 is a control plane function entity in the wireless communication system, a server for temporarily storing user data, and it is responsible for managing and storing UE context (e.g. UE/user identification, mobility management status, user security parameters, etc.), allocating a temporary identification for a user, and authenticating the user when the UE is located in the tracking region or the network; processing all non-access layer messages between the MME 103 and UE; and triggering paging in System Architecture Evolution (SAE).

Figure 2:
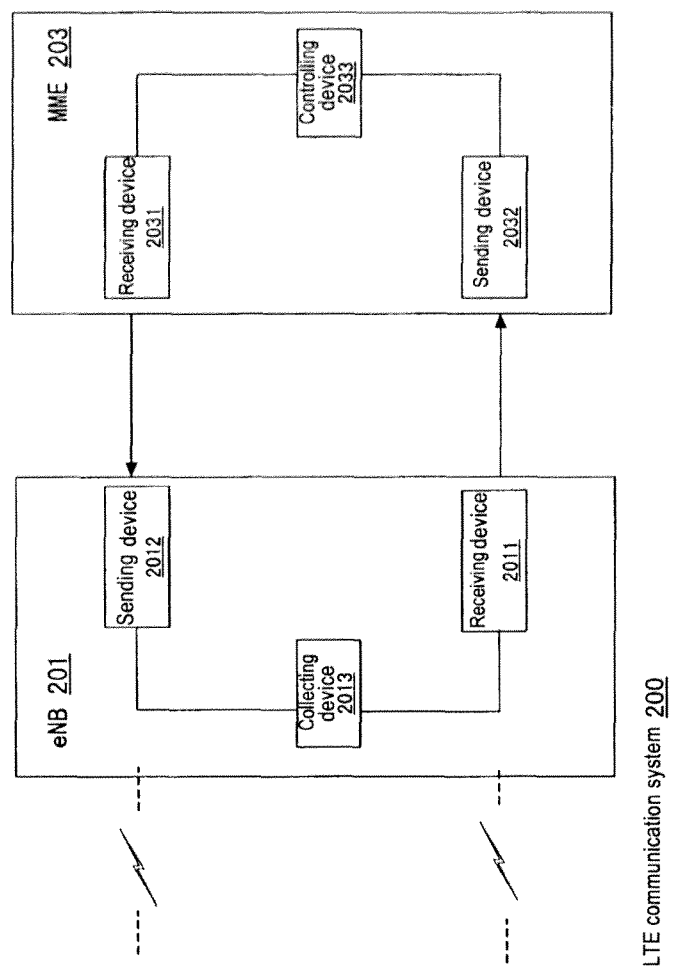
FIG. 2 illustrates a structure block diagram of the LTE system according to one embodiment of the present invention.

FIG. 2 illustrates the structure of a LTE communication system according to one embodiment of the present invention. FIG. 2 schematically shows a LTE communication system 200 which includes an eNB 201 and a MME 203 and is capable of collecting the PCMD. It needs to be pointed out that FIG. 2 only shows a schematic structure of the LTE communication system including one eNB 201 and one MME 203 so as to avoid confusion. It should be noted that in the schematic FIG. 2, the conventional structure or construction is omitted to avoid blurring the understanding of the present invention.

Firstly, the eNB 201 and the MME 203 must enable respective PCMD-related functions according to the received instruction to activate the PCMD-related functions. The eNB 201 and the MME 203 utilize an S1 application protocol private message (S1AP PRIVATE MESSAGE) to support the PCMD.

As illustrated in FIG. 2, the MME 203 includes a receiving device 2031 configured to receive an instruction to start/stop PCMD collection, and a private message including an indication of whether the eNB 201 is capable of collecting the PCMD and a private message including the collected PCMD, both of which are sent by a sending device 2012 of the eNB 201; a sending device 2032 configured to send a private message including an indication of starting and/or stopping collecting the PCMD to the eNB 201 capable of collecting the PCMD; and a controlling device 2033 configured to control, when the instruction to start the PCMD collection is received, the sending device 2032 to send the private message including the indication of starting collecting the PCMD to the eNB 201 capable of collecting the PCMD, and to control, when the instruction to stop the PCMD collection is received, the sending device 2032 to send the private message including the indication of stopping collecting the PCMD to the eNB 201 capable of collecting the PCMD. The MME 203 further includes a processing device (not shown) configured to process the PCMD data received by the receiving device 2031 of the MME 203.

The eNB 201 includes a receiving device 2011 configured to receive the private message including the indication of starting and/or stopping collecting the PCMD sent from the MME 203; the sending device 2012 configured to send to the MME device the private message including the collected PCMD and the private message including the indication of whether the eNB 201 is capable of collecting the PCMD; and a collecting device 2013 configured to collect the PCMD for at least one user equipment (UE) connection processed by the MME device, when the private message including the indication of starting collecting the PCMD is received.

How the respective devices in FIG. 2 interact to implement the method for collecting the PCMD according to the present invention will be described below in detail by making references to FIG. 3.

Figure 3:
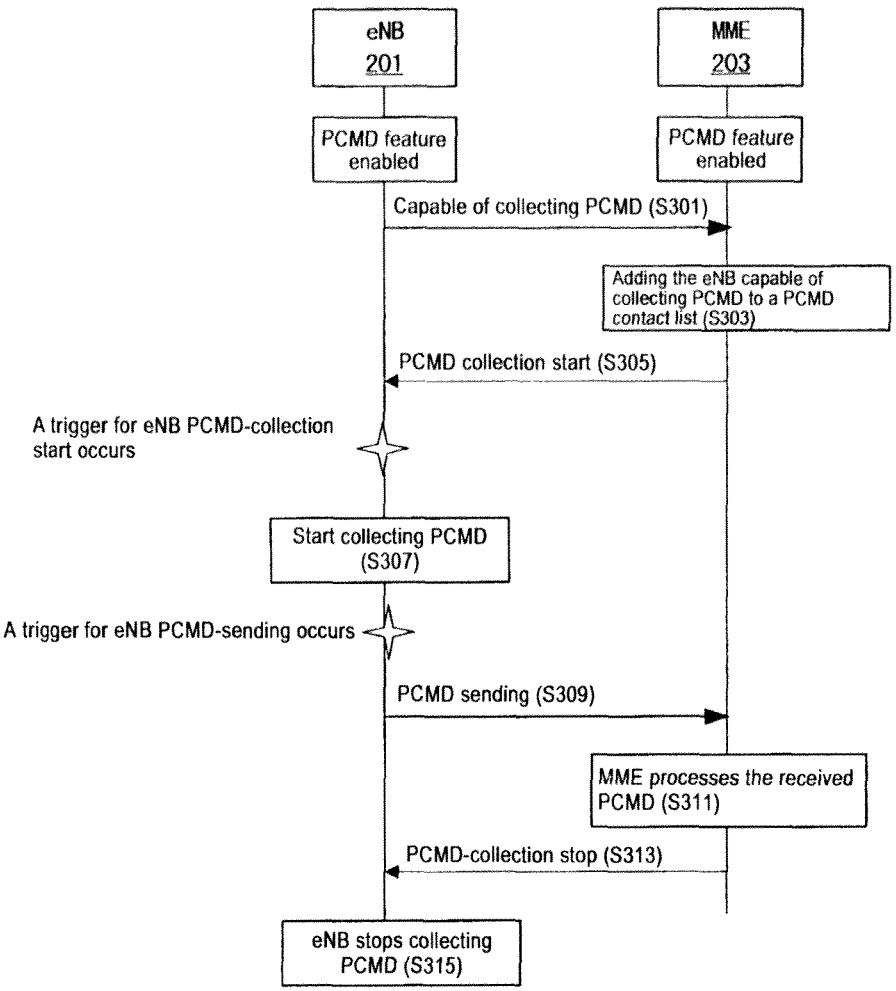
FIG. 3 illustrates a message flowchart of collecting PCMD in the LTE system according to one embodiment of the present invention.

FIG. 3 illustrates a message flowchart of collecting the PCMD in the LTE system according to exemplary embodiments of the present invention. The method for collecting the PCMD in the present invention will be described below in conjunction with FIG. 3.

PCMD Activation:

The eNB 201 and the MME 203 respectively receive an instruction to activate PCMD-related functions to enable the respective PCMD-related functions.

In step S301, after the S1 setup procedure, the eNB 201 sends, via its sending device 2012, to the MME 203 with which it has an S1 association, an S1AP: PRIVATE MESSAGE private message, indicating whether it is capable of collecting the PCMD so as to inform the MME 203 whether it is "capable of collecting PCMD" or "incapable of collecting PCMD".

In step S303, the MME 203 adds the eNB 201 capable of collecting the PCMD into its PCMD contact list based on the S1AP: PRIVATE MESSAGE private message received by the receiving device 2031.

Start PCMD Collection:

In step S305, when an administrator sends to the MME 203 an instruction to start PCMD collection so as to start a PCMD collection operation, the sending device 2032 of the MME 203 informs the eNB 201 capable of collecting the PCMD of starting collecting the PCMD. Specifically, the sending device 2032 sends to the eNB 201 capable of collecting the PCMD an S1AP: PRIVATE MESSAGE including PCMD-Collection Start to start the PCMD collection.

In step S307, the eNB 201 via the collecting device 2013 starts collecting PCMD parameters for all UE connections processed by the MME 203 that sends the S1AP: PRIVATE MESSAGE including the PCMD-Collection Start. The collecting device 2013 of the eNB 201 starts collecting the UE's PCMD data whenever any of the following signaling for triggering to start the PCMD collection occurs:

Initial Context Setup Request signaling received from the MME 203;

RRC Connection Reconfiguration Complete signaling received from the UE for handover complete to trigger a target cell to collect the PCMD data;

RRC Connection Reestablishment Request signaling received from the UE.

Send PCMD Data:

In step S309, the eNB 201 sends, via its sending device 2012, an S1AP: PRIVATE MESSAGE including the collected PCMD data to the MME 203 which controls UE sessions, whenever any of the following signaling for triggering PCMD sending occurs:

UE Context Release Complete signaling sent to the MME 203 (PCMD data is sent prior to sending the UE Context Release Complete signaling);

RRC Connection Reconfiguration Complete signaling received from the UE for intra-eNB 201 handover to trigger a source cell to send the PCMD data;

X2 UE Context Release signaling received from the target eNB 201.

PCMD Data Correlation and Processing:

When transporting eNB PCMD, PCMD version, eNB UE S1AP ID, MME UE S1AP ID shall be contained in the S1AP: PRIVATE MESSAGE. A PCMD version number is used to identify the version to ensure that the MME 203 can properly parse the eNB PCMD parameters and integrate them into the main PCMD record. The eNB UE S1AP ID and the MME UE S1AP ID are used to identify the UE connection between the eNB and the MME 103.

In step S311, after receiving via the receiving device 2031 the S1AP: PRIVATE MESSAGE including the PCMD data collected by the base station, a processing device (not shown) of the MME 203 processes the received PCMD. Specifically, the processing device of the MME 203 integrates the received eNB PCMD data into the PCMD record which is maintained at the MME 203 for that UE connection. The UE PCMD record collected by the MME 203 and the eNB 201 are saved on a local disk. A remote real-time processing program can be connected to the MME 203 to retrieve each PCMD record as a real-time data stream. A post-processing PCMD analysis program can access all records pertaining to each supported LTE procedure performed by the UE.

PCMD Deactivation:

When the administrator wants to stop the PCMD collection, the administrator sends to the MME 203 an instruction to stop the PCMD collection so as to stop the PCMD collection operation. In step S313, the MME 203 sends an S1AP: PRIVATE MESSAGE including PCMD-Collection Stop to all eNBs 201 capable of collecting the PCMD by the sending device 2032 based on the instruction received by the receiving device 2031.

In step S315, the eNB 201 having received the "PCMD-Stop" stops the PCMD collection for all UE connections controlled by the MME 203, and discards any unsent PCMD data for those UEs.

Alternatively, the administrator informs the eNB 201 to deactivate the PCMD collection, and then the eNB 201 stops the PCMD collection for all UEs and discards any unsent PCMD data for those UEs, and informs all the MMEs 203 with which it has an S1 association that it is "incapable of collecting PCMD" via an S1AP: PRIVATE MESSAGE indicating "being incapable of collecting PCMD".

The PCMD can provide valuable data for analyzing the performance of a communication network and troubleshooting the communication network. In exemplary embodiments of the present invention, the method for enabling/disabling PCMD collection according to the present invention utilizes the PCMD to analyze the performance of a LTE network and troubleshoot the LTE network.

The method according to the present invention can be used by many vendors. 3GPP 36.413 specifies the Private Message mechanism for vendors to implement vendor specific functionality. The private message S1AP: PRIVATE MESSAGE in TS36.413 is used to support the PCMD between the MME 103 and the eNB 101.

The method according to the present invention is a network based solution, depending on both eNB 101 and MME 103. Compared with the existing measurement counter collection, the PCMD collection method according to the present invention provides a more flexible and scalable manner for reporting system performance information, and it can be used to analyze individual communication connections.

Those skilled in the art shall readily recognize that different steps of the method described above may be implemented by a programmed computer. Here, some embodiments include a program storage apparatus (e.g. a digital data storage medium), which is machine or computer readable, and encoding machine executable or computer executable program instructions, wherein the instructions implement some or all steps of the above method. The program storage apparatus may be, for example, a digital memory, a magnetic storage medium (such as a magnetic disk and a magnetic tape), hardware or an optical readable digital data storage medium. The embodiments also include a programmed computer for implementing the steps of the above method.

The descriptions and drawings only illustrate the principle of the present invention. Thus, it should be recognized that those skilled in the art can suggest different structures. Although the different structures are not explicitly described or shown herein, they reflect the principle of the present invention and are included in the spirit and scope of the present invention. In addition, all examples mentioned here are definitely, mainly used only for teaching purposes to help a reader to understand the principle of the present invention and the conception contributed by inventors for improvement in the art, and should not be construed as limitations on the specifically mentioned examples and conditions. In addition, all of the statements and the specific examples herein mentioning the principles, aspects and implementations of the present invention include the equivalents thereof.

What is claimed is:

1. A method for collecting per call measurement data PCMD, comprising:
    when an instruction to activate a PCMD-related function is received, sending by a base station a message including an indication of whether the base station is capable of collecting the PCMD to a mobility management entity MME device;
    when an instruction to start PCMD collection is received, sending by the MME device a message including an indication of starting collecting the PCMD to at least one base station capable of collecting the PCMD;
    based on the received indication of starting collecting the PCMD, collecting by the base station the PCMD for at least one user equipment UE connection.

2. The method according to claim 1, further comprising:
    sending by the base station a message including the collected PCMD to the MME device.

3. The method according to claim 1, further comprising:
    when an instruction to stop the PCMD collection is received, sending by the MME device a message including an indication of stopping collecting the PCMD to the at least one base station capable of collecting the PCMD.

4. The method according to claim 3, further comprising:
    based on the received indication of stopping collecting the PCMD, stopping the PCMD collection for the at least one UE connection and discarding any unsent PCMD data for the at least one UE connection by the base station.

5. The method according to claim 1, further comprising:
    based on the received message including the indication of whether the base station is capable of collecting the PCMD, adding by the MME device the base station capable of collecting the PCMD to a PCMD contact list of the MME device.

6. The method according to claim 1, further comprising: when an instruction to deactivate the PCMD-related function is received, sending by the base station a message indicating that the base station is incapable of collecting the PCMD to at least one MME device having a signaling association with the base station.

7. A mobility management entity MME device for collecting per call measurement data PCMD, comprising:
   a receiving device for receiving an instruction to start/stop PCMD collection and for receiving a message including an indication of whether the base station is capable of collecting the PCMD; and
   a controlling device for controlling, when the instruction to start the PCMD collection is received, a sending device to send a message including an indication of starting collecting the PCMD to at least one base station capable of collecting the PCMD, and controlling, when the instruction to stop the PCMD collection is received, the sending device to send a message including an indication of stopping collecting the PCMD to the at least one base station capable of collecting the PCMD; and
   the sending device for sending the message including the indication of starting and/or stopping collecting the PCMD to the at least one base station capable of collecting the PCMD.

8. The mobility management entity MME device according to claim 7, wherein the receiving device is further configured for receiving a message sent by the base station, which includes the collected PCMD.

9. A base station for collecting per call measurement data PCMD, comprising:
   a receiving device for receiving a message sent from a mobility management entity MME device, which includes an indication of starting and/or stopping collecting the PCMD;
   a collecting device for collecting the PCMD for at least one user equipment UE connection when the message including the indication of starting collecting the PCMD is received; and
   a sending device for sending a message including the collected PCMD to the MME device and for sending a message including an indication of whether the base station is capable of collecting the PCMD to the MME device.

\* \* \* \* \*